UNITED STATES PATENT OFFICE

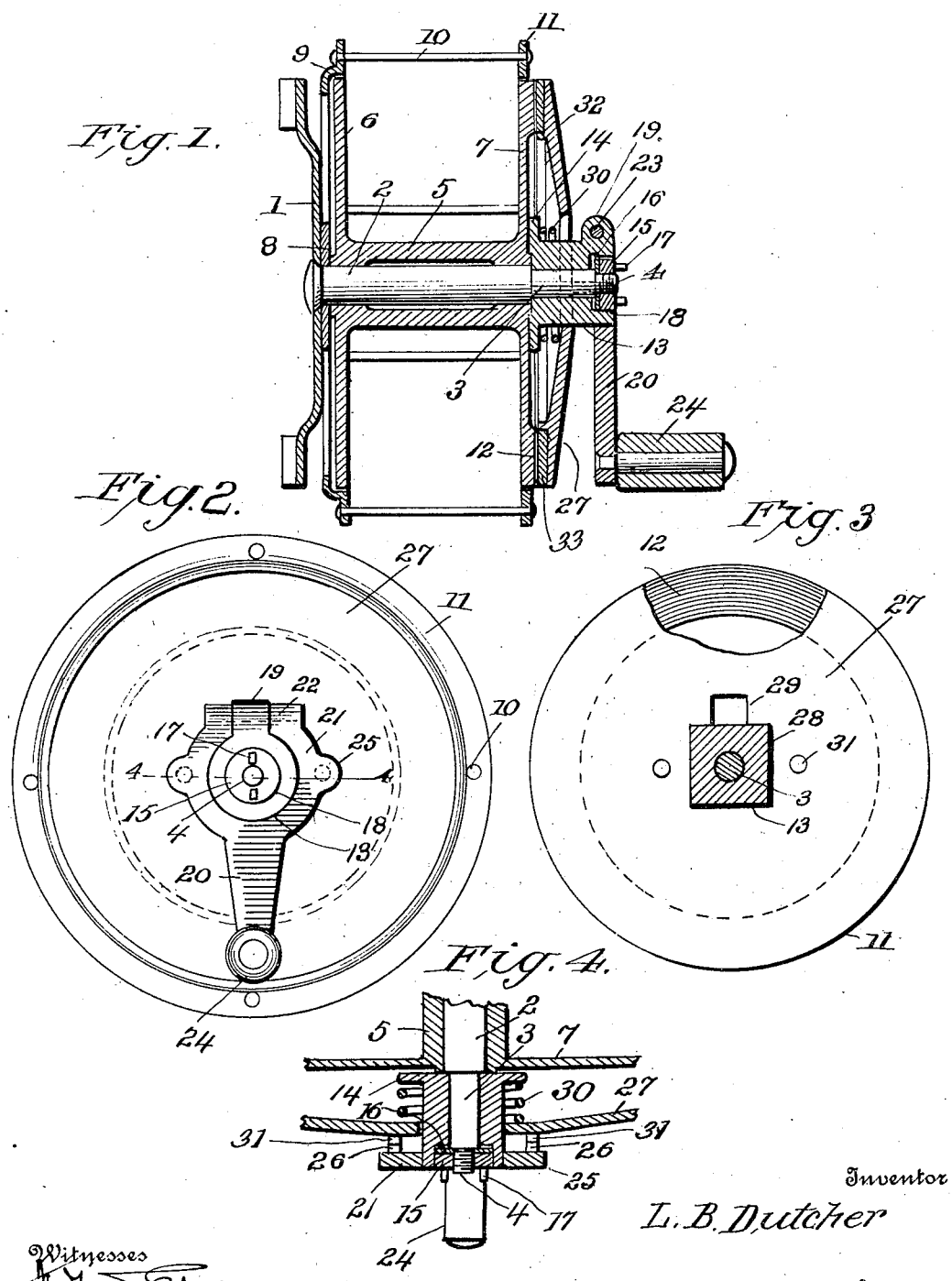

LEWIS BELDEN DUTCHER, OF OSWEGO, NEW YORK.

REEL.

1,077,461.

Specification of Letters Patent.

Patented Nov. 4, 1913.

Application filed May 23, 1912. Serial No. 699,271.

*To all whom it may concern:*

Be it known that I, LEWIS BELDEN DUTCHER, citizen of the United States, residing at Oswego, in the county of Oswego and State of New York, have invented certain new and useful Improvements in Reels, of which the following is a specification.

This invention relates to fishing reels.

One aim of the invention is to provide a reel so constructed that the line wound thereon will not be liable to be broken should a hooked fish make a sudden rush.

Another aim of the invention is to so construct the reel that the speed with which the line is paid out when a fish is caught, may be controlled by the fisherman.

The invention further has as its object to provide a reel particularly adapted for casting, in that the spool is so mounted that it may run entirely free while the line is running out but may be stopped in an instant by the fisherman and without the use of both hands.

For a full understanding of the invention reference is to be had to the following description and accompanying drawing, in which:—

Figure 1 is a vertical transverse sectional view through the reel embodying the present invention. Fig. 2 is a side elevation thereof. Fig. 3 is a side elevation of the friction disk of the reel, a portion being broken away. Fig. 4 is a horizontal sectional view on the line 4—4 of Fig. 2.

Corresponding and like parts are referred to in the following description and indicated in all the views of the accompanying drawing by the same reference characters.

In the drawing the reel plate is indicated by the numeral 1, and is of the ordinary construction and adapted for application to the usual reel seat. The spindle of the reel is indicated at 2 and is secured at one end to the plate 1 and projects laterally therefrom and at its outer end is reduced as at 3 and beyond this portion is further reduced and threaded as at 4. The spool of the reel includes the usual hub 5 and heads 6 and 7. The spool rotates within a frame which includes a head 8 secured upon the spindle 2 and having a rim 9 which extends about the periphery of the head 6 of the spool. Pins 10 extend from the rim 9 and support a similar rim 11 which extends about the periphery of the head 7 of the spool. For a purpose to be presently explained, the spool head 7 is thickened at its periphery as at 12 and the outer face of the spool at its thickened portion is smoothly finished so as to form a friction surface.

Rotatably mounted upon the reduced portion 3 of the spindle 2 is a head 13 which is substantially rectangular in cross section and is formed at its inner end with a flange 14. The head is held against disengagement from the portion 3 of the spindle by a nut 15 which is threaded upon the end 4 of the said spindle and bears against a washer 16 disposed against the shoulder formed between the portions 3 and 4. This nut is provided at its outer face with studs 17 which may be engaged by a suitable wrench for the purpose of rotating the nut.

By referring to Figs. 1, 2 and 4 of the drawing it will be observed that the head 13 is formed in its outer end with a recess 18 in which the nut 15 is received. It will also be observed that the said head is formed at its said end with a pivot lug 19. The handle by which the spool is rotated is indicated at 20 and is formed with a substantially annular head 21 provided with spaced pintle lugs 22 between which the lug 19 is received, the pivot pin 23 being inserted through all of these lugs. The handle is in this manner pivotally mounted upon the head 13 and may consequently be swung toward or away from the spool of the reel. The handle is provided with the usual grip 24 which may be gripped for the purpose of rotating it and, for a purpose to be presently explained, has its head formed with laterally projecting oppositely located ears 25 each formed with a stud 26 projecting toward the head 7 of the spool.

The reel includes a friction disk which is designed to coöperate with the head 7 of the spool and this disk is indicated at 27 and is formed axially with a substantially rectangular opening 28 which receives the head 13 in the manner shown in Figs. 1, 3 and 4 of the drawing, it being understood that the disk is in this manner slidably mounted upon the head, but at the same time held for rotation therewith. One wall of the opening 28 is notched as at 29 so as to permit of the disk being slipped off from the head 13 after the handle 20 has been removed therefrom. A spring 30 is arranged upon the head 13 between the flange 14 thereof and the inner face of the disk 27 and this disk is preferably concavo-convex, as illustrated in Figs. 1 and 4 of the drawing, and is formed upon its outer face at opposite sides of the opening 28 with studs 31 which project toward and are to be engaged by the studs 26 upon the head of the handle in a manner shown in Fig. 4 and for a purpose to be presently pointed out. The inner face of the disk 27 is formed adjacent its periphery with an annular bead 32 and secured to that portion of the said face between this bead and the periphery of the disk is an annular friction disk 33 which is preferably of brass, copper, or some other relatively soft metal or alloy.

It will be observed by reference to Fig. 1 of the drawing that the friction disk 33 is located directly opposite the friction face of the head 7, and it will be understood that by sliding the disk 27 upon the head 13, the friction member 33 may be moved into and out of coöperative relation to the said friction face of the head 7 and that the spring 30 normally holds the said disk out of such coöperative relation with respect to the head.

It will now be understood that normally the spool or reel is free to rotate upon its spindle 2, and that when it is desired to positively rotate it the handle is to be swung to the left in Fig. 1 so as to bring the studs 26 into engagement against the studs 31 and thereby force the disk 27 against the spool head 7, whereupon the handle is turned to rotate the spool. It will also be apparent that should a fish be hooked and make a sudden rush, the spool being free to rotate upon its spindle, would allow the line to be paid out practically without resistance, although the fisherman could readily govern the speed with which the line is running out by pressing to the left with the handle 20 so as to cause the friction disk 27 to engage more or less firmly against the head of the spool and in fact sufficient pressure can be exerted in this manner to positively hold the spool against rotation.

While not herein shown, it will be evident that the ordinary click and drag might be arranged in connection with the spool, although the means for retarding the speed of rotation of the spool and for positively rotating the same, as herein shown and described, is sufficient for all purposes.

Having thus described the invention what is claimed as new is:—

1. In a reel, a support, a spindle carried thereby, a spool mounted for rotation upon the spindle, a friction member arranged to have braking coöperation with the spool, means normally holding the said member away from the spool, and a pivoted handle operable to rotate the said member and to move the same into coöperative relation to the spool.

2. In a reel, a support, a spindle carried thereby, a spool mounted for rotation upon the spindle, a friction member arranged to have braking coöperation with the spool, means normally holding the said member away from the spool, and a rotatable handle pivotally mounted and arranged when rotated to rotate the said member and when swung upon its pivot in one direction to move the member into coöperative relation to the spool.

3. In a reel, a support, a spindle carried thereby, a spool mounted for rotation upon the spindle, a friction member arranged to have braking coöperation with the spool, a spring interposed between the member and the spool and normally holding the member away from the spool, and a handle mounted for rotation and arranged when rotated to rotate the said member, the handle being movable toward the spool and upon such movement being arranged to move the friction member against the tension of the spring and into coöperative relation to the spool.

4. In a reel, a support, a spindle carried thereby, a spool mounted for rotation upon the spindle, a member rotatably mounted upon the spindle at one side of the spool, a friction member slidably mounted upon the first mentioned member and rotatable therewith and arranged for coöperation with the said side of the spool, means yieldably holding the friction member away from the spool, and a handle pivoted to the first mentioned member and operable to rotate the same and arranged when moved upon its pivot in one direction to move the said friction member into engagement with the spool.

5. In a reel, a support, a spindle carried thereby, a spool mounted for rotation upon the spindle, a member rotatably mounted upon the spindle, a friction disk mounted upon the said member and held for rotation therewith and slidable thereon into and out of coöperative relation with respect to the said member and operable to rotate the same and thereby rotate the friction disk, a handle pivoted to the said member, the handle being movable upon its pivot, in one direction, to move the friction disk into frictional engagement with the said head of the spool, and a spring interposed between the said member and the friction disk and normally holding the latter out of coöperative engagement with the spool head.

6. In a reel, a support, a spindle carried thereby, a spool mounted for rotation upon the spindle, a head rotatable upon the spindle, a friction disk slidably mounted upon the said head, and rotatable therewith, the said disk having an annular friction facing arranged to be brought to bear against one head of the spool when the said disk is slid on the head in the direction of the spool, the head being provided with a flange, a spring arranged upon the head and bearing at one end against the flange and at its other end against the inner face of the said friction disk, and a handle pivoted to the said head and arranged for rotation to rotate the head, the handle having projections arranged to bear against the friction disk when the handle is swung in the direction of the said disk whereby the disk may be moved into frictional engagement with the said head of the spool.

In testimony whereof I affix my signature in presence of two witnesses.

LEWIS BELDEN DUTCHER. [L. S.]

Witnesses:
 JANE I. MACKAY,
 ALEXANDER V. MUELLER.

Copies of this patent may be obtained for five cents each, by addressing the "Commissioner of Patents, Washington, D. C."